United States Patent
Naitou et al.

(10) Patent No.: US 7,236,675 B2
(45) Date of Patent: Jun. 26, 2007

(54) PROCESS FOR PRODUCING OPTICAL WAVEGUIDE

(75) Inventors: Ryusuke Naitou, Osaka (JP); Amane Mochizuki, Osaka (JP); Kazunori Mune, Osaka (JP); Kenichi Tagawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/006,674

(22) Filed: Dec. 8, 2004

(65) Prior Publication Data

US 2005/0129377 A1 Jun. 16, 2005

(30) Foreign Application Priority Data

Dec. 9, 2003 (JP) ............ P. 2003-410751

(51) Int. Cl.
*G02B 6/10* (2006.01)
*G02B 6/12* (2006.01)

(52) U.S. Cl. .................................. 385/131; 385/14
(58) Field of Classification Search ............ 385/14, 385/129–131
See application file for complete search history.

(56) References Cited

U.S. PATENT DOCUMENTS

| 6,096,482 A | 8/2000 | Omote ............ 430/311 |
|---|---|---|
| 6,100,582 A | 8/2000 | Omote ............ 257/699 |
| 6,389,215 B1 | 5/2002 | Lindsay et al. |
| 6,408,122 B1 * | 6/2002 | Shimada et al. ............ 385/129 |
| 6,654,535 B2 * | 11/2003 | Teramoto et al. ............ 385/132 |
| 6,678,453 B2 * | 1/2004 | Bellman et al. ............ 385/129 |
| 6,842,577 B2 * | 1/2005 | Shelnut et al. ............ 385/143 |
| 7,011,932 B2 * | 3/2006 | Ferm et al. ............ 430/321 |
| 2002/0051614 A1 | 5/2002 | Teramoto et al. |
| 2004/0234222 A1 * | 11/2004 | Kuroda et al. ............ 385/129 |

FOREIGN PATENT DOCUMENTS

| CN | 1203511 A | 12/1998 |
|---|---|---|
| EP | 0 720 030 A1 | 7/1996 |
| EP | 1 424 577 A2 | 6/2004 |
| JP | 2002-90559 A | 3/2002 |

OTHER PUBLICATIONS

European Search Report dated May 6, 2005.
Chinese Office Action dated Jan. 5, 2007.

* cited by examiner

*Primary Examiner*—Sung Pak
*Assistant Examiner*—Daniel Petkovsek
(74) *Attorney, Agent, or Firm*—Sughrue Mion, PLLC

(57) ABSTRACT

The invention provides a process for producing an optical waveguide, which comprises the steps of: forming a substrate adhesion layer on a surface of a substrate from a layer-forming material containing a coupling agent; forming an undercladding layer on the substrate adhesion layer; and forming a core layer having a predetermined pattern on the undercladding layer through a wet process with a developing solution.

4 Claims, 2 Drawing Sheets

PROCESS FOR PRODUCING OPTICAL WAVEGUIDE

FIELD OF THE INVENTION

The present invention relates to a process for producing an optical waveguide which is extensively used in optical communication, optical information processing, and other general optical fields.

BACKGROUND OF THE INVENTION

Optical waveguides are incorporated in optical waveguide devices, optical integrated circuits, and optical wiring boards and are in extensive use in optical communication, optical information processing, and other general optical fields. In the case of such an optical waveguide produced on a substrate such as, e.g., silicon or silica, it is constituted of a core layer which transmits light and cladding layers which have a lower refractive index than the core layer. This optical waveguide, illustratively stated, has a three-layer structure comprising an undercladding layer, a core layer formed thereon, and an overcladding layer which surrounds the core layer. Various polymeric materials are used as materials for forming the two cladding layers, i.e., the undercladding layer and the overcladding layer, and as materials for forming the core layer.

For example, fluorinated polyimides, which are satisfactory in light transmission as well as heat resistance, have been used as a material for forming the two cladding layers and a material for forming the core layer. However, the fluorinated polyimides have poor adhesion to substrates. It has hence been proposed to form an undercoat layer between a substrate and a cladding layer from the standpoint of improving adhesion between the substrate and the cladding layer. It has also been proposed to incorporate a coupling agent into the undercoat layer in order to further improve adhesion (see, for example, patent document 1).

Since the layer constitution described above necessitates complicated production steps, a technique is being investigated in which a coupling agent is directly incorporated into a cladding layer to secure adhesion between a substrate and the cladding layer without forming an undercoat layer.

Patent Document 1: JP 2002-90559 A

However, formation of an undercladding layer from the material for undercladding layer formation which contains a coupling agent has the following drawback. When a core layer having a predetermined pattern is formed on the undercladding layer through patterning by a wet process using an alkaline developing solution or the like, the undercladding layer opacities. This opacification of the undercladding layer is by no means desirable for optical waveguides because it results in a propagation loss.

SUMMARY OF THE INVENTION

The invention has been achieved in view of such circumstances. An object of the invention is to provide a process for optical-waveguide production which is free from the opacification during core layer patterning and by which an optical waveguide having a reduced light propagation loss can be obtained.

Other objects and effects of the invention will become apparent from the following description.

The invention provides a process for optical-waveguide production having the following constitution so as to accomplish the objects. Namely, the process comprises the steps of:

forming a substrate adhesion layer on a surface of a substrate from a layer-forming material containing a coupling agent;

forming an undercladding layer on the substrate adhesion layer; and forming a core layer having a predetermined pattern on the undercladding layer through a wet process with a developing solution.

The present inventors made extensive investigations in order to find out the cause of the undercladding layer opacification which has occurred hitherto during core layer patterning by a wet process using a developing solution and also to secure sufficient adhesion between a substrate and an undercladding layer. As a result, it was found that the opacification of the undercladding layer is caused by the coupling agent incorporated in the material used for forming the undercladding layer. Namely, the material for undercladding layer formation which contains a coupling agent has poor resistance to developing solutions and, as a result, the undercladding layer opacities during core layer patterning by a wet process. It has hence been found that when a substrate adhesion layer containing a coupling agent is first formed on a substrate and an undercladding layer is formed on this substrate adhesion layer, then the undercladding layer does not opacify during core layer patterning because it contains no coupling agent causative of opacification. It was further found that since an undercladding layer is superposed on the substrate through the substrate adhesion layer containing a coupling agent, adhesion between the substrate and the substrate adhesion layer and adhesion between the substrate adhesion layer and the undercladding layer are improved and, as a result, satisfactory adhesion between the substrate and the undercladding layer can be secured. The invention has been achieved based on these findings.

In the process of the invention, a substrate adhesion layer is formed on a surface of a substrate using a layer-forming material containing a coupling agent and an undercladding layer is formed on this substrate adhesion layer, as stated above. Subsequently, a core layer having a predetermined pattern is formed on the undercladding layer through a wet process using a developing solution, to thereby produce an optical waveguide. Because of this constitution, sufficient adhesion between the substrate and undercladding layer in the optical waveguide obtained is secured since the substrate adhesion layer is interposed therebetween. In addition, when a core layer is formed through the wet process using a developing solution, the undercladding layer does not opacify because it contains no coupling agent causative of deterioration in resistance to developing solutions. An increase in propagation loss is hence prevented. Consequently, an optical waveguide having a reduced light propagation loss and excellent transparency can be obtained. Furthermore, the wet processing technique according to the invention gives a core layer having side walls with a smooth surface in contrast to the conventional dry etching technique for core layer formation, which gives a core layer having side walls with surface irregularities. Consequently, the invention can provide an optical waveguide having a reduced propagation loss.

The invention further has an advantage that when an alkaline aqueous solution of an alcohol, in particular, a mixed aqueous solution of tetramethylammonium hydroxide and ethanol, is used as the developing solution, satisfactory resolution is obtained and the rate of development is easy to regulate.

Figure 1:
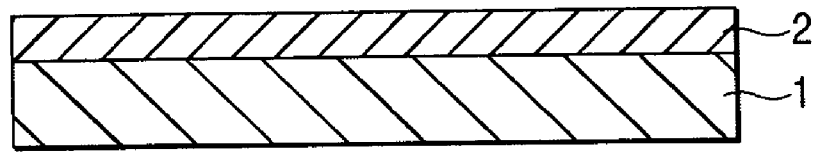
FIG. 1 is a sectional view illustrating a step in the process for optical-waveguide production of the invention.

The reference numerals and signs used in the drawings denote the followings, respectively.

1: substrate
2: substrate adhesion layer
3: undercladding layer
4b: core layer
5: overcladding layer

DETAILED DESCRIPTION OF THE INVENTION

Figure 6:
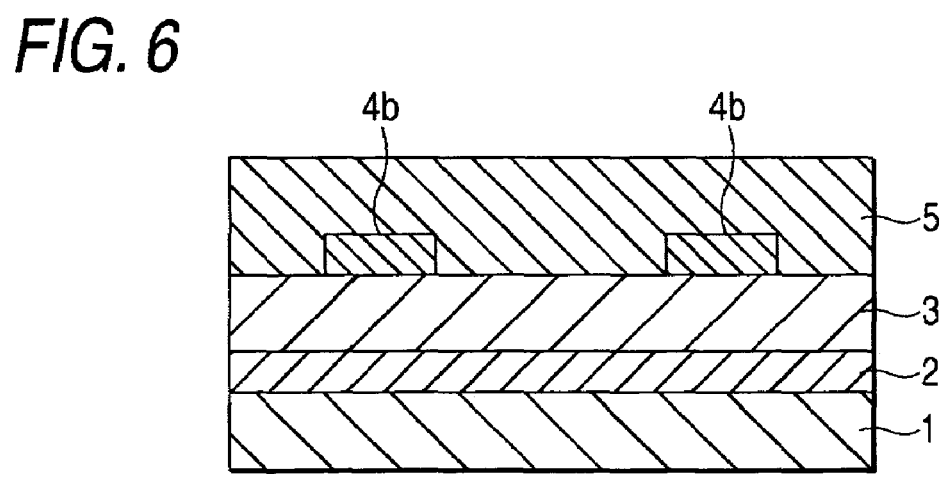
FIG. 6 is a sectional view illustrating an example of the constitution of an optical waveguide obtained by the process for optical-waveguide production of the invention.

Examples of optical waveguides obtained by the process for optical-waveguide production of the invention include one having the layer constitution shown in FIG. 6. This optical waveguide comprises a substrate 1, a substrate adhesion layer 2 superposed thereon, an undercladding layer 3 superposed on the substrate adhesion layer 2, a core layer 4b which has a predetermined pattern and has been formed on the undercladding layer 3, and an overcladding layer 5 formed so as to surround the core layer 4b.

The material of the substrate 1 is not particularly limited. Examples thereof include known ones such as blue flat glasses, synthetic silica, silicon wafers, silicon wafers coated with silicon dioxide, and polyimide resins.

Examples of materials usable for forming the substrate adhesion layer 2 to be superposed on the substrate 1 include polyimide resin precursors containing a coupling agent. The polyimide resin precursors are obtained by reacting a tetra-carboxylic dianhydride with a diamine. A mixture prepared by incorporating a coupling agent into such a polyimide resin precursor is used as a material for forming the layer.

Examples of the tetracarboxylic dianhydride include pyromellitic dianhydride, 3,3',4,4'-biphenyltetracarboxylic dianhydride, 2,2-bis(2,3-dicarboxyphenyl)-1,1,1,3,3,3-hexafluorporpane dianhydride, 2,2-bis(3,4-dicarboxyphenyl)-1,1,1,3,3,3-hexafluoropropane dianhydride, 3,3',4,4'-benzophenonetetracarboxylic dianhydride, bis(3,4-dicarboxyphenyl) ether dianhydride, and bis(3,4-dicarboxyphenyl) sulfone dianhydride. These may be used singly or in combination of two or more thereof.

On the other hand, examples of the diamine include m-phenylenediamine, p-phenylenediamine, 3,4'-diaminodiphenyl ether, 4,4'-diaminodiphenyl ether, 4,4'-diaminodiphenyl sulfone, 3,3'diaminodiphenyl sulfone, 2,2-bis(4-aminophenoxyphenyl)propane, 2,2-bis(4-aminophenoxyphenyl)hexafluoropropane, 1,3-bis(4-aminophenoxy)benzene, 1,4-bis(4-aminophenoxy)benzene, 2,4-diaminotoluene, 2,6-diaminotoluene, diaminodiphenylmethane, 4,4'diamino-2,2-dimethylbiphenyl, and 2,2'-bis(trifluoromethyl)benzidine. These may be used singly or in combination of two or more thereof.

The coupling agent is not particularly limited, and examples thereof include various known coupling agents. However, from the standpoint of improving adhesion to the substrate 1, it is preferred to use 1,3-bisamino(3-aminopropyl)1,1,3,3-tetramethyldisiloxane among the known coupling agents.

The content of the coupling agent is preferably regulated so as to be in the range of from 0.5 to 50 mol % based on the diamine amount. This is because contents of the coupling agent lower than 0.5 mol % based on the diamine amount may result in insufficient adhesion to the substrate 1, while contents thereof exceeding 50 mol % tend to result in a substrate adhesion layer 2 having a reduced strength.

For synthesizing the polyimide resin precursor which contains a coupling agent and is to be used as a material for forming the substrate adhesion layer 2, an ordinary synthesis method can be used. Namely, in a nitrogen atmosphere, a tetracarboxylic dianhydride is added to a solvent containing a diamine dissolved therein and a coupling agent is further added thereto. This mixture is stirred at room temperature for 5 to 20 hours. Thus, a viscous polymer solution (polyimide resin precursor solution) can be synthesized.

The solvent is not particularly limited as long as it is one for ordinary use in synthesizing polyimide resin precursors. For example, a polar solvent such as N,N-dimethylacetamide (DMAc) or N-methylpyrrolidone (NMP) can be used. From the standpoint of transparency, it is preferred to use DMAc of these because it is less susceptible to pyrolysis during a heating step.

Examples of materials usable for forming the undercladding layer 3 to be superposed on the substrate adhesion layer 2 include polyimide resin precursors. The precursors are obtained by reacting a tetracarboxylic dianhydride with a diamine.

As the tetracarboxylic dianhydride, there can be used those shown-above-with regard to materials for forming the substrate adhesion layer 2.

As the diamines also, there can be used those shown above with regard to materials for forming the substrate adhesion layer 2.

Also, synthesis of a polyimide resin precursor to be used as a material for forming the undercladding layer 3 can be conducted by an ordinary synthesis method similarly to that for the polyimide resin precursor to be used as a material for forming the substrate adhesion layer 2.

A photosensitive polyimide resin precursor containing one or more ingredients including a photosensitizer can be used as a material for forming the core layer 4b having a predetermined pattern on the undercladding layer 3. The photosensitive polyimide resin precursor is obtained by incorporating one or more additives including a photosensitizer into the polyimide resin precursor described above, which is obtained by reacting a tetracarboxylic dianhydride with a diamine.

The polyimide resin precursor is not particularly limited, and examples thereof include various polyimide resin precursors. Specifically, examples thereof include polyimide resin precursors usable as materials for forming the undercladding layer 3.

For constituting an optical waveguide, the core layer 4b should have a higher refractive index than the two cladding layers 3 and 5. The refractive indexes of these layers can be regulated, for example, by selecting a combination of the tetracarboxylic dianhydride with the diamine or by incorporating an additive such as a photosensitizer into the material for forming a core layer 4b. Specifically, the relationship between the refractive index of the core layer 4b and the refractive index of each of the cladding layers 3 and 5 preferably is such that the specific refractive index difference Δ for the core layer and cladding layer [specific refractive index difference Δ=[(n of core)−(n of cladding)]/(n of core) (n: refractive index)] is usually in the range of from 0.2 to 1.0%.

The photosensitizer is not particularly limited. Examples thereof include compounds represented by the following general formula (1).

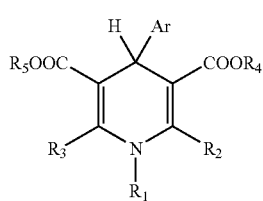

(1)

In formula (1), Ar represents an aromatic group having a nitro group at an ortho position with respect to the bonding position to the 1,4-dihydropyridine ring; $R_1$ represents a hydrogen atom or an alkyl group having 1 to 3 carbon atoms; and $R_2$, $R_3$, $R_4$, and $R_5$ may be the same or different from one another and each represent a hydrogen atom or an alkyl group having 1 or 2 carbon atoms.

It is especially preferred to use 1-ethyl-3,5-dimethoxycarbonyl-4-(2-nitrophenyl)-1,4dihydropyridine as the photosensitizer among the compounds represented by general formula (1), from the standpoints of cost and reduced light absorption by C—H bonds.

Such a photosensitizer represented by general formula (1) is synthesized, for example, in the following manner. Namely, such a 1,4-dihydropyridine derivative can be obtained by reacting a substituted benzaldehyde, an alkyl propiolate (alkyl ester of propargylic acid) which is used in a molar amount 2 times the amount of the aldehyde, and the corresponding primary amine in glacial acetic acid with refluxing (Khim. Geterotsikl. Soed., pp.1067-1071, 1982).

The content of the photosensitizer in the photosensitive polyimide precursor as a material for forming the core layer 4b is regulated preferably to from 0.05 parts by weight (hereinafter abbreviated as "parts") to less than 5 parts, especially preferably to from 0.05 parts to 4 parts, per 100 parts of the polyimide resin precursor. The reasons for this are as follows. In case where the content of the photosensitizer is 5 parts by weight or higher, absorption by the photosensitizer in a near infrared region tends to pose a problem. On the other hand, contents thereof lower than 0.05 parts tend to result in insufficient contrast.

A dissolution control agent can be appropriately incorporated into the photosensitive polyimide precursor in order to improve resolution.

Examples of the dissolution control agent include polyethylene glycol, polypropylene glycol, polypropylene glycol diphenyl ether, and polyethylene glycol dimethyl ether. These may be used singly or in combination of two or more thereof. Especially from the standpoint of pattern resolution, it is preferred to use polyethylene glycol dimethyl ether. The weight-average molecular weight of such a compound is preferably in the range of 150 to 1,000, especially 200 to 800.

The amount of the dissolution control agent to be incorporated is preferably in the range of 15 to 45 parts per 100 parts of the polyimide precursor.

Examples of materials usable for forming the overcladding layer 5 which surrounds the core layer 4b having a predetermined pattern include polyimide resin precursors. Specifically, examples thereof include polyimide precursors usable as materials for forming the substrate adhesion layer 2, materials for forming the undercladding layer 3, and materials for forming the core layer 4b.

An embodiment of the process for optical-waveguide production of the invention using the substrate and layer-forming materials described above will be explained below.

First, a coupling agent-containing polyimide resin precursor solution (poly(amic acid) solution) as a material for substrate adhesion layer formation is applied on a substrate in such an amount as to result in a film thickness after drying of preferably 0.1 to 50 μm, especially preferably 5 to 10 μm, and then dried to thereby form a resin layer made of a polyimide resin precursor composition. For the application, use can be made of a general film-forming technique such as, e.g., spin coating or casting. Subsequently, the coated substrate is heated in an inert atmosphere to thereby complete removal of the solvent remaining in the resin layer and imidization of the polyimide resin precursor. Thus, a substrate adhesion layer 2 made of a coupling agent-containing polyimide resin is formed on the substrate 1 as shown in FIG. 1.

Figure 2:
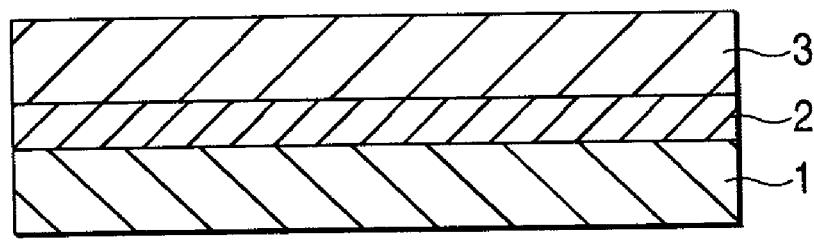
FIG. 2 is a sectional view illustrating another step in the process for optical-waveguide production of the invention.

Subsequently, a polyimide resin precursor solution (poly (amic acid) solution) is applied on the substrate adhesion layer 2 in such an amount as to result in a film thickness after drying of preferably 1 to 30 μm, especially preferably 5 to 15 μm, and then dried to thereby form a resin layer made of a polyimide resin precursor composition. For the application, use can be made of a general film-forming technique such as, e.g., spin coating or casting as in the step described above. The coating film is then heated in an inert atmosphere to thereby complete removal of the solvent remaining in the resin layer and imidization of the polyimide resin precursor. Thus, an undercladding layer 3 made of a polyimide resin is formed over the substrate 1 as shown in FIG. 2.

Figure 3:
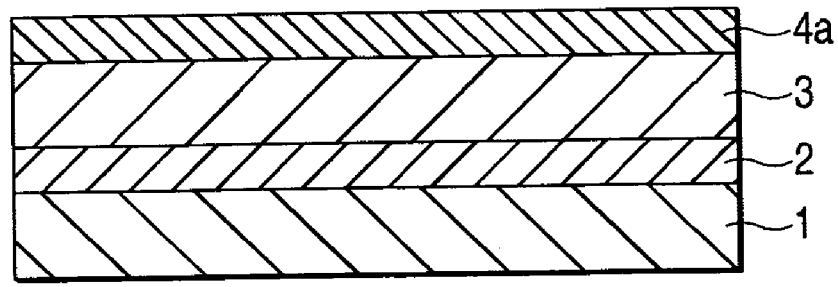
FIG. 3 is a sectional view illustrating a still other step in the process for optical-waveguide production of the invention.
Figure 4:
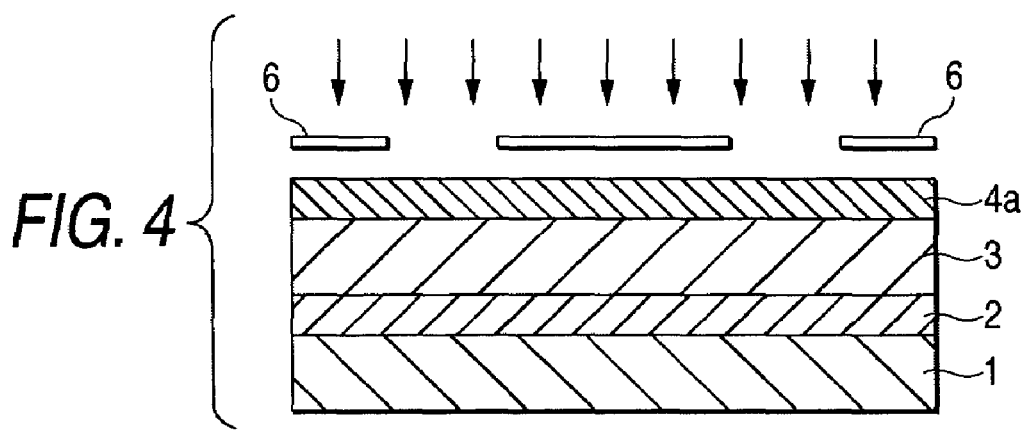
FIG. 4 is a sectional view illustrating a still other step in the process for optical-waveguide production of the invention.
Figure 5:
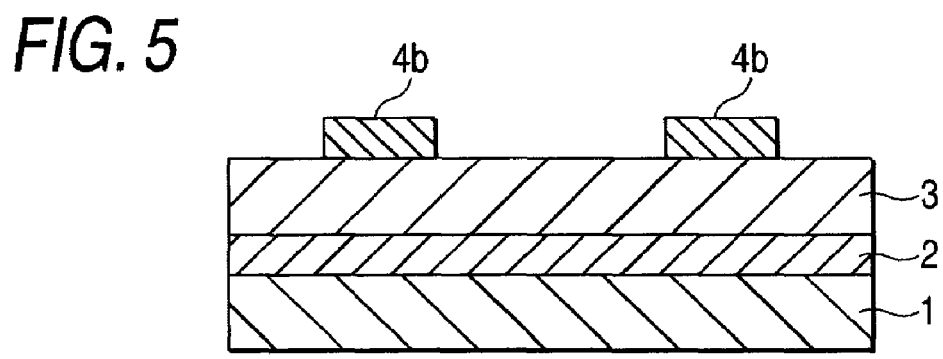
FIG. 5 is a sectional view illustrating a stillother step in the process for optical-waveguide production of the invention.

A photosensitive polyimide resin precursor solution (photosensitive poly(amic acid) varnish) which is a material giving a layer having a higher refractive index than the undercladding layer 3 is subsequently applied on the undercladding layer 3 in such an amount as to result in a film thickness after drying of preferably 2 to 30 μm, especially preferably 6 to 10 μm. This coating layer is preliminarily dried to form a photosensitive polyimide resin precursor layer 4a which becomes a core layer, as shown in FIG. 3. Subsequently, a photomask 6 is placed over the photosensitive polyimide resin precursor layer 4a so as to obtain a desired pattern, and ultraviolet irradiation is carried out on the layer 4a from above the photomask 6 as shown in FIG. 4. In the invention, when the exposure amount in the ultraviolet irradiation is 5 to 50 mJ/cm$^2$, sufficient resolution is possible. Thereafter, the heat treatment after exposure which is called post exposure bake (PEB) is conducted in order to complete the photoreaction, and development with a developing solution (wet processing technique) is conducted. The desired pattern thus obtained by the development is usually subjected to a heat treatment in order to imidize the pattern. This treatment is performed at a temperature of generally 300 to 400° C. to conduct solvent removal and curing reaction (cure) under vacuum or in a nitrogen atmosphere. Through the imidization thus conducted, a patterned core layer 4b made of a polyimide resin is formed as shown in FIG. 5.

The developing solution for use in the development is not particularly limited. However, for example, an alkaline aqueous solution of an alcohol is used. More specifically, it is preferred to use a mixed aqueous solution of tetramethylammonium hydroxide and ethanol from the standpoints of satisfactory resolution and ease of the regulation of development rate. In the mixed aqueous solution, the proportion of tetramethylammonium hydroxide and that of ethanol are preferably regulated so as to be in the ranges of 2 to 10% by weight and 40 to 50% by weight, respectively.

Subsequently, a polyimide resin precursor solution which is a layer-forming material giving a layer having a lower refractive index than the core layer 4b is applied over the core layer 4b in such an amount as to result in a maximum film thickness after drying of preferably 1 to 30 μm, especially preferably 5 to 15 μm, and then dried to thereby form a resin layer made of a polyimide resin precursor composition. This resin layer is subsequently heated in an inert atmosphere as in the case of the undercladding layer 3 to thereby complete removal of the solvent remaining in the resin layer and imidization of the polyimide resin precursor. Thus, an overcaldding layer 5 made of a polyimide resin is formed so as to surround the core layer 4b as shown in FIG. 6, to thereby produce an optical waveguide.

Examples of the optical waveguide thus obtained include straight optical waveguides, bend optical waveguides, crossing optical waveguides, Y-branched optical waveguides, slab optical waveguides, Mach-Zehnder type optical waveguides, AWG (alley wave guide) type optical waveguides, grating optical waveguides, and optical waveguide lenses. Examples of optical elements employing such optical waveguides include wavelength filters, optical switches, optical branch units, optical multiplexers, optical multiplexers/demultiplexers, optical amplifiers, wavelength modulators, wavelength division multiplexers, optical splitters, directional couplers, and optical transmission modules having a laser diode or photodiode hybrid-integrated therewith.

EXAMPLES

The present invention will be illustrated in greater detail with reference to the following Examples, but the invention should not be construed as being limited thereto.

Poly(Amic Acid) Solution I Containing Coupling Agent

In a 500-mL separable flask equipped with a stirrer, 26.66 g (0.06 mol) of 2,2-bis(3,4-dicarboxyphenyl)hexafluoropropane dianhydride (6FDA) as an acid dianhydride, 18.54 g (0.058 mol) of 2,2'-bis(trifluoromethyl)benzidine (BTFB), and 0.52 g (0.002 mol) of 1,3-bis(3-aminopropyl)-1,1,3,3tetramethyldisiloxane (APDS) as a coupling agent were dissolved in 182.85 g (2.10 mol) of N,N-dimethylacetamide (DMAc) as an organic solvent. Thereafter, the resultant solution was stirred at room temperature for 10 hours to thereby produce a poly(amic acid) solution I (polyimide resin precursor solution) containing the coupling agent.

Poly(Amic Acid) Solution II

On the other hand, 6FDA and BTFB as used above were reacted in an equimolar proportion in DMAc as used above with stirring at room temperature for 10 hours to produce a poly(amic acid) solution II (polyimide resin precursor solution).

Example 1

The coupling agent-containing poly(amic acid) solution I was applied on a 525 μm-thick silicon wafer substrate by spin coating in such an amount as to result in a thickness after heat treatment of 5 μm. The solution applied was dried at 90° C. to thereby form a resin layer made of a polyimide resin precursor composition containing the coupling agent. Thereafter, the resin layer was heated at 385° C. under vacuum to thereby complete removal of the solvent remaining in the resin film and imidization of the polyimide resin precursor. Thus, a substrate adhesion layer 2 (thickness, 5 μm) made of a polyimide resin containing the coupling agent (APDS) was formed on the silicon wafer substrate 1 as shown in FIG. 1.

The poly(amic acid) solution II was applied by spin coating on the substrate adhesion layer 2 formed on the silicon wafer substrate 1, in such an amount as to result in a thickness after heat treatment of 15 μm. The solution applied was dried at 90° C. to thereby form a resin film made of a polyimide resin precursor composition. Thereafter, the resin layer was heated at 385° C. under vacuum to thereby complete removal of the solvent remaining in the resin film and imidization of the polyimide resin precursor. Thus, an undercladding layer 3 having a thickness of 15 μm (refractive index, 1.51) was formed on the substrate adhesion layer 2 (thickness, 5 μm) as shown in FIG. 2.

Subsequently, a photosensitive polyimide resin precursor solution as a material for core layer formation was prepared in the following manner in order to form a core layer on the undercladding layer 3. To the poly(amic acid) solution (II) was added 1-ethyl-3,5-dimethoxycarbonyl-4-(2-nitrophenyl)-1,4-dihydropyridine as a photosensitizer in an amount of 2% by weight based on the solid component of the poly(amic acid) solution II. Polyethylene glycol dimethyl ether having a weight-average molecular weight of 500 was further added thereto as a dissolution control agent in an amount of 30% by weight based on the solid component of the poly(amic acid) solution II. Thus, a photosensitive polyimide resin precursor composition was obtained as a solution (photosensitive polyimide resin precursor solution).

Thereafter, the photosensitive polyimide resin precursor solution was applied on the undercladding layer 3 and dried at 90° C. in the same manner as in the formation of the undercladding layer 3 to thereby form a photosensitive polyimide resin precursor layer 4a made of a photosensitive polyimide resin precursor composition as shown in FIG. 3. A predetermined photomask 6 (line width 6 μm×length 50 mm×interval 0.2 mm) was placed on this photosensitive polyimide resin precursor layer 4a, and the layer 4a was exposed to ultraviolet irradiation from above the photomask 6 in an amount of 30 mJ/cm$^2$ as shown in FIG. 4. Furthermore, post-exposure heating was conducted at 170° C. for 10 minutes.

An aqueous solution containing tetramethylammonium hydroxide and ethanol (a developing solution for photosensitive polyimide, TE-5011, manufactured by Nitto Denko Corporation) was subsequently used as a developing solution to develop the layer 4a at 35° C. and dissolve away the unexposed areas. Thereafter, the layer 4a was rinsed with water to thereby form a pattern having a negative image. This pattern was heated at 330° C. under vacuum to thereby complete imidization of the polyimide resin precursor after the development. Thus, a core layer 4b (refractive index, 1.52) having a predetermined pattern was formed as shown in FIG. 5. The core layer 4b formed had a sectional size of 6 µm×6 µm. In this operation, the undercladding layer 3 was not opacified at all by the development.

Subsequently, the poly(amic acid) solution (polyimide resin precursor solution) II was used as a material for forming an overcladding layer over the core layer 4b, and applied in the same manner as in the formation of the undercladding layer 3. Namely, the poly(amic acid) solution II was applied by spin coating in such an amount as to result in a thickness after heat treatment of 15 µm and dried at 90° C. to thereby form a resin film made of a polyimide resin precursor composition. Thereafter, this resin film was heated at 330° C. under vacuum to thereby complete removal of the solvent remaining in the resin film and imidization of the polyimide resin precursor. As a result, an overcladding layer 5 (refractive index, 1.51) having a maximum thickness of 20 µm was formed so as to surround the core layer 4b as shown in FIG. 6. Thus, an optical waveguide made of a polyimide resin was produced.

The optical waveguide thus obtained was subjected to end face processing with a dicer and then examined for light propagation loss by the cutback method at a wavelength of 1.55 µm. As a result, the optical waveguide was found to have a light propagation loss of 0.5 dB/cm.

COMPARATIVE EXAMPLE 1

The coupling agent-containing poly(amic acid) solution I was applied on a 525 µm-thick silicon wafer substrate by spin coating in such an amount as to result in a thickness after heat treatment of 15 µm. The solution applied was dried at 90° C. to thereby form a resin layer made of a polyimide resin precursor composition containing the coupling agent. Thereafter, the resin layer was heated at 385° C. under vacuum to thereby complete removal of the solvent remaining in the resin film and imidization of the polyimide resin precursor. Thus, an undercladding layer (thickness, 15 µm) made of a polyimide resin containing the coupling agent was formed on the silicon wafer substrate.

Subsequently, the photosensitive polyimide resin precursor solution was applied on the undercladding layer formed on the silicon wafer substrate, and dried at 90° C. to thereby form a photosensitive polyimide resin precursor layer made of a photosensitive polyimide resin precursor composition. Thereafter, in the same manner as in Example 1, a predetermined photomask (line width 6 µm×length 50 mm×interval 0.2 mm) was placed on this photosensitive polyimide resin precursor layer, and the layer was exposed to ultraviolet irradiation from above the photomask in an amount of 30 mJ/cm². Furthermore, post-exposure heating was conducted at 170° C. for 10 minutes.

An aqueous solution containing tetramethylammonium hydroxide and ethanol (a developing solution for photosensitive polyimide, TE-5011, manufactured by Nitto Denko Corporation) was subsequently used as a developing solution to develop the polyimide resin precursor layer at 35° C. and dissolve away the unexposed areas. Thereafter, the layer was rinsed with water to thereby form a pattern having a negative image. This pattern was heated at 330° C. under vacuum to thereby complete imidization of the polyimide resin precursor after the development. Thus, a core layer (refractive index, 1.52) having a predetermined pattern was formed. The core layer formed had a sectional size of 6 µm×6 µm. In this operation, the undercladding layer was opacified by the development.

Subsequently, the poly(amic acid) solution (polyimide resin precursor solution) II was used as a material for forming an overcladding layer over the core layer, and applied in the same manner as in the formation of the undercladding layer. Namely, the poly(amic acid) solution II was applied by spin coating in such an amount as to result in a thickness after heat treatment of 15 µm and dried at 90° C. to thereby form a resin film made of a polyimide resin precursor composition. Thereafter, this resin film was heated at 330° C. under vacuum to thereby complete removal of the solvent remaining in the resin film and imidization of the polyimide resin precursor. As a result, an overcladding layer (refractive index, 1.51) having a maximum thickness of 20 µm was formed so as to surround the core layer. Thus, an optical waveguide made of a polyimide resin was produced.

The optical waveguide thus obtained was subjected to end face processing with a dicer and then examined for light propagation loss by the cutback method at a wavelength of 1.55 µm. As a result, the optical waveguide was found to have a light propagation loss of 1.0 dB/cm.

COMPARATIVE EXAMPLE 2

Dry Etching Method

A silicon wafer substrate having a thickness of 525 µm and the poly(amic acid) solution I containing a coupling agent were used to form a substrate adhesion layer (thickness, 5 µm) made of a polyimide resin containing the coupling agent (APDS) on the silicon wafer substrate in the same manner as in Example 1.

Thereafter, the poly(amic acid) solution II was used to form an undercladding layer (refractive index, 1.51) having a thickness of 15 µm on the substrate adhesion layer (thickness, 5 µm) formed on the silicon wafer substrate, in the same manner as in Example 1.

Subsequently, the photosensitive polyimide resin precursor solution as a material for core layer formation was applied on the undercladding layer and dried at 90° C. in the same manner as in the formation of the undercladding layer. Thus, a photosensitive polyimide resin precursor layer made of a photosensitive polyimide resin precursor composition was formed.

This photosensitive polyimide resin precursor layer was wholly exposed to ultraviolet irradiation in an amount of 30 mJ/cm². This layer was then heated at 330° C. under vacuum to thereby complete imidization of the exposed polyimide resin precursor and form a polyimide resin layer.

Thereafter, an etching resist (line width 6 µm×length 50 mm×interval 0.2 mm; a pattern reverse to that of the photomask described above) was formed on the polyimide resin layer. The exposed areas of the polyimide resin layer which were not covered with the etching resist were removed by RIE (reactive ion etching). Thereafter, the etching resist was removed to thereby form a core layer (refractive index, 1.52) having a predetermined pattern. The core layer formed had a sectional size of 6 µm×6 µm.

Subsequently, the poly(amic acid) solution (polyimide resin precursor solution) II was used as a material for forming an overcladding layer over the core layer in the same manner as in Example 1, whereby an overcladding layer (refractive index, 1.51) having a maximum thickness of 20 µm was formed so as to surround the core layer. Thus, an optical waveguide made of a polyimide resin was produced.

The optical waveguide thus obtained was subjected to end face processing with a dicer and then examined for light propagation loss by the cutback method at a wavelength of 1.55 µm. As a result, the optical waveguide was found to have a light propagation loss of 1.0 dB/cm. Side walls of the core layer formed were examined with a microscope. As a result, the walls were found to have surface irregularities.

The examination results given above show that the optical waveguide obtained in Example 1 had a lower light propagation loss and better transparency than the optical waveguides obtained in the Comparative Examples.

Examples of the optical waveguide obtained by the process for optical-waveguide production of the invention include straight optical waveguides, bend optical waveguides, crossing optical waveguides, Y-branched optical waveguides, slab optical waveguides, Mach-Zehnder type optical waveguides, AWG type optical waveguides, grating optical waveguides, and optical waveguide lenses. Examples of optical elements employing such optical waveguides include wavelength filters, optical switches, optical branch units, optical multiplexers, optical multiplexers/demultiplexers, optical amplifiers, wavelength modulators, wavelength division multiplexers, optical splitters, directional couplers, and optical transmission modules having a laser diode or photodiode hybrid-integrated therewith.

While the present invention has been described in detail and with reference to specific embodiments thereof, it will be apparent to one skilled in the art that various changes and modifications can be made therein without departing from the spirit and scope thereof.

The present application is based on Japanese patent application No. 2003-410751 filed Dec. 9, 2003, the contents thereof being herein incorporated by reference.

What is claimed is:

1. A process for producing an optical waveguide, which comprises the steps of:

forming a substrate adhesion layer on a surface of a substrate from a layer-forming material containing a coupling agent and a polyimide resin precursor;

forming an undercladding layer on the substrate adhesion layer;

forming a core layer precursor on the undercladding layer; and dissolving parts of the core layer precursor through a wet process with a developing solution so as to develop the core layer precursor.

2. The process for producing an optical waveguide of claim 1, wherein the developing solution is an alkaline aqueous solution of an alcohol.

3. The process for producing an optical waveguide of claim 2, wherein the alkaline aqueous solution of an alcohol is a mixed aqueous solution of tetramethylammonium hydroxide and ethanol.

4. The process for producing an optical waveguide of claim 3, wherein the alkaline aqueous solution of an alcohol contains tetramethylammonium hydroxide and ethanol in proportions of 2 to 10% by weight and 40 to 50% by weight, respectively.

* * * * *